United States Patent
Charial

(10) Patent No.: US 8,490,384 B2
(45) Date of Patent: Jul. 23, 2013

(54) METHOD FOR CORRECTING NITROGEN OXIDE EMISSION MODELS

(75) Inventor: Christophe Charial, Jouars-Pontchartrain (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 441 days.

(21) Appl. No.: 12/992,065

(22) PCT Filed: May 5, 2009

(86) PCT No.: PCT/FR2009/050835
§ 371 (c)(1), (2), (4) Date: Nov. 10, 2010

(87) PCT Pub. No.: WO2009/150336
PCT Pub. Date: Dec. 17, 2009

(65) Prior Publication Data
US 2011/0094209 A1    Apr. 28, 2011

(30) Foreign Application Priority Data
May 16, 2008   (FR) ...................................... 08 53181

(51) Int. Cl.
*F01N 3/20*   (2006.01)
(52) U.S. Cl.
USPC .................. 60/277; 60/274; 60/276; 60/286; 60/287; 60/295; 60/301
(58) Field of Classification Search
USPC .................. 60/274, 276, 277, 282, 286, 287, 60/295, 301
See application file for complete search history.

(56) References Cited

U.S. PATENT DOCUMENTS

| 7,452,724 | B2 | 11/2008 | Wickert | |
| 2004/0098974 | A1* | 5/2004 | Nieuwstadt et al. | 60/286 |
| 2009/0266059 | A1* | 10/2009 | Kesse et al. | 60/295 |
| 2009/0301066 | A1* | 12/2009 | Sindano et al. | 60/286 |

FOREIGN PATENT DOCUMENTS

| DE | 10 2005 042 490 A1 | 3/2007 |
| DE | 10 2006 041 676 A1 | 3/2008 |
| FR | 2850134 A1 | 7/2004 |

OTHER PUBLICATIONS

International Search Report from corresponding International App. No. PCT/FR2009/050835 issued Oct. 23, 2009.

* cited by examiner

*Primary Examiner* — Binh Q Tran
*Assistant Examiner* — Jorge Leon, Jr.
(74) *Attorney, Agent, or Firm* — Polster Lieder Woodruff & Lucchesi, L.C.

(57) ABSTRACT

The invention relates to a method for correcting a model for determining the amount of reducing agent to inject for the selective catalytic reduction of nitrogen oxides contained in exhaust gases, which includes the following steps: determining an amount of reducing agent to inject based on the amount of nitrogen oxides emitted and an initial mathematical model; determining, by taking a measurement from the catalyst of the amount and/or nature of the gas, whether or not the reducing reaction is carried out under correct conditions; if an anomaly is detected, adjusting the amount of reducing agent to inject; and if the use of said method leads to a number of repeated adjustments of the same nature greater than a predetermined value N: the mathematical model is corrected, and the initial mathematical model is replaced by the corrected model.

9 Claims, 2 Drawing Sheets

METHOD FOR CORRECTING NITROGEN OXIDE EMISSION MODELS

The present application is the U.S. national stage under 35 U.S.C. §371 of International Application No. PCT/FR2009/050835 which claims the priority of French application 0853181 filed on May 16, 2008.

BACKGROUND

The present invention is situated in the domain of exhaust gas treatment of automotive vehicles, specifically exhaust gas treatment systems using a reducing agent injected in the exhaust line of a vehicle.

This invention relates, more specifically, to a method intended for implementation in automotive vehicles equipped with a treatment system for nitrogen oxide emitted by a diesel engine, in which the treatment takes place through selective catalytic reduction of nitrogen oxide by means of a reducing agent such as ammonia.

These treatment systems treat the exhaust gas in such a manner that the vehicles meet the legally tolerated emission levels, which are continuously lowered.

The present invention finds an advantageous, but not exclusive, application in vehicles equipped with the type of treatment systems in which the reducing agent, such as ammonia, is stored in aqueous solution in a reservoir, for instance in the form of liquid urea.

The reduction of nitrogen oxide by ammonia through a selective catalytic reduction reaction is a widely used method in stationary factories. The difficulty of transposing this kind of processes in the automotive domain resides in the storage of the reducing agent in the vehicle.

Several solutions have been developed for storing a reducing agent such as ammonia in an automotive vehicle. Solutions were proposed for storing the ammonia in the form of solid urea, liquid urea or ammonium carbamate.

Selective catalytic reduction systems, called SCR, comprise in general a catalyst, the site of one or more chemical reduction reactions of nitrogen oxide by ammonia, and are designated in what follows by the term SCR catalyst.

It was observed that for more efficient treatment of nitrogen oxides, it was helpful to store the ammonia directly inside the SCR catalyst, the site of the chemical reduction. However, the size of the SCR catalyst does not permit storing a sufficient quantity of reducing agent to guarantee an acceptable autonomy of the vehicle. Consequently, in existing systems, a reducing agent reservoir is used which is separate from the SCR catalyst, and the injection of reducing agent in the catalyst is regulated, with an eye on storage, starting from a mathematical model with the quantity of nitrogen oxide emitted by the engine as one of the inputs.

It was however observed that the storage characteristics of the catalyst vary over the lifetime of a vehicle, in particular on account of the reduced storage capacity with age. Consequently, it appeared necessary to permanently control the injection of reducing agent in the catalyst.

Initially, methods were envisaged in which the injection was instantly modified by increasing or decreasing the calculated quantity by means of the mathematical model. To this end, the nature/composition of the emitted gas flowing out of the catalyst is determined by means of a nitrogen oxide sensor. If the emitted gas at the outlet is nitrogen oxide, this means that the injected quantity of reducing agent is insufficient to reduce all nitrogen oxide and if, on the contrary, the emitted gas is a reducing agent such as ammonia, this means that too much reducing agent was injected upstream of the catalyst.

However, it is also possible that the observed over-injections and under-injections are not due to aging of the catalyst, but to an error in the mathematical model for determining the quantity of reducing agent to be injected in the system.

BRIEF SUMMARY

In order to remedy this, the goal of the present invention is to propose a method for correcting the calculation model so that, if it is observed that several successive corrections of the quantity of reducing agent are necessary, the mathematical calculation model itself is corrected.

The invention relates to a method for correcting the calculation model of the quantity of reducing agent to be injected for selective catalytic reduction of nitrogen oxide contained in the exhaust gas, in particular the exhaust gas emitted by an internal combustion engine of an automotive vehicle. The method comprises the stages of determining the quantity of reducing agent to be injected as a function of the emitted quantity of nitrogen oxide and a mathematical model, said model is typically recorded in the memory of the on board processor of the vehicle, determining the character and the correctness of the conditions in which the reduction reaction takes place by measuring the quantity and/or the composition of the gas at the outlet of the catalyst, modifying the quantity of reducing agent to be injected if an anomaly is detected and, if implementation of this method leads to a number of successive modifications of the same direction (i.e., successive increases or successive decreases) greater than a predetermined value N, correcting the initial mathematical model and replacing the initial mathematical model by the corrected model.

In preferred manner, the stage of determining whether the reaction takes place in the correct conditions comprises the stages of determining, as a function of the measurement of the quantity of gas at the outlet of the catalyst, the conversion efficiency of nitrogen oxide in response to an injection of the determined quantity of reducing agent, comparing this so-called real efficiency, with a required minimum efficiency and, if the difference between the required efficiency and real efficiency is greater than a predetermined threshold, detecting the presence of an anomaly.

In one implementation mode of the invention, if the modification of the quantity of reducing agent made during one occurrence of the process is of the same direction as the modification made during the preceding occurrence, a counter controlled by the processor which operates the process is incremented, and if the modification is of different direction than the one performed during the preceding occurrence, the value of the counter is initialized at zero.

According to one implementation mode of the invention, the correction of the mathematical model consists in applying a corrective factor corresponding with the predetermined correction factor weighted by a variable parameter as a function of the operating status of the vehicle.

In one implementation mode of the invention, the predetermined correction factor is a positive factor in case the successive modifications are increases, and a negative factor in case the successive modifications are decreases.

Furthermore, in one implementation example, the variable parameter allows weighting of the correction factor as a function of engine speed and engine torque.

In an advantageous implementation mode, this weighting is done by determining the operating zones, defined by a range of engine speed values and a range of engine torque values, and by defining a law of variation of the variable parameter so that the value of the parameter is constant inside each of the zones, and represents the elapsed time in this zone relative to total time, over a specific period.

The elapsed time is reinitialized, for instance, with each correction of the mathematical model, and the determined period is defined as the period situated between the preceding correction of the mathematical model and the present correction.

The invention relates also to a system for treatment of exhaust gas installed in an automotive vehicle, in which the treatment consists of selective catalytic reduction, in a catalyst, of nitrogen oxide contained in the exhaust gas by the reducing agent stored in a reservoir and injected in the exhaust line, the system comprises a mathematical model for determining the quantity of reducing agent to be injected, and comprising means for implementing a determination method conform to the invention.

BRIEF DESCRIPTION OF THE DRAWINGS

Other characteristics and advantages of the invention will become clear with the detailed description of certain implementation modes, this description is given as non-limiting example by means of the figures in which.

DETAILED DESCRIPTION

Figure 1A:
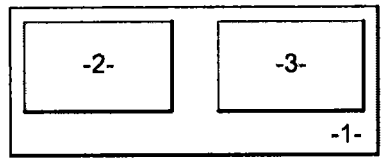
FIGS. 1a and 1b represent the functional architecture of the SCR control strategy in an automotive vehicle.
Figure 1B:
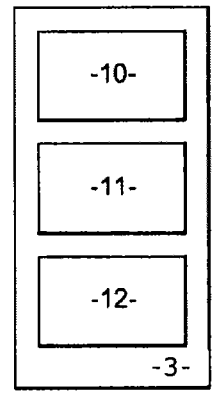

FIG. 1 shows the functional architecture of a module 1 for implementing the SCR control strategy in an automotive vehicle. This architecture is described below in the case of a system using ammonia as reducing agent, or more exactly a urea solution, stored in a reservoir and injected in the exhaust line, and which, taking into account the heat in the exhaust line, is transformed into ammonia, which then reacts with the NOx. However, this architecture is by no means limited to this specific case, and can be adapted to any other reducing agent.

In the following description, the terms "reducing agent" and "ammonia" are used interchangeably, and knowing that, in all cases, all means and characteristics described here can be used with any other reducing agent.

In general such strategy is implemented with a specific processor installed for this purpose in the automotive vehicle, or with an existing processor, such as the engine control module.

At the functional level, module 1 implementing the overall control strategy can be divided in two complementary modules: a module 2 controlling the injection of urea, and a module 3 controlling the stored urea.

Module 2 controlling the injection of urea is used for determining the quantity of urea to be injected at any time in the exhaust. This decision is made starting from all information supplied by module 3 controlling the stored urea, which will be detailed later.

Module 3 has the task of ensuring the injection and, in this framework, of managing the urea reservoir. Among the functionalities of this module, we can cite the urea heating function in case of frost.

The goal of the present invention is to propose a method for controlling the consumption of reducing agent, and is therefore intended to be integrated in module 3 controlling the stored urea.

In more precise manner, this control module 3 comprises three sub-modules, namely a module 10 for on board diagnostics, a module 11 for calculating the necessary quantity of urea to be injected, and a module 12 for closed loop control of the quantity of urea to be injected.

Module 10 is a module which verifies in real time the operating status of the exhaust gas post-treatment system.

Module 11 determines at any time the quantity of urea that must be injected in the exhaust to obtain the most effective reduction of nitrogen oxides. This calculation is done starting from parameters relative to the engine, such as speed and torque, or relative to the exhaust, such as temperature of the catalyst, or the ratio between the quantity of nitrogen monoxide and nitrogen dioxide in the exhaust gas. The goal of this computation is to optimize the efficiency of the conversion of nitrogen oxide emitted by the engine, while maintaining the emission of ammonia below the regulatory thresholds.

Module 12 will eventually correct the quantity of urea determined by module 11, for instance as a function of a measurement performed by a nitrogen oxide sensor installed in the outlet of the SCR catalyst. With this correction the aging of the catalyst, in particular, can be taken into account.

Figure 2:
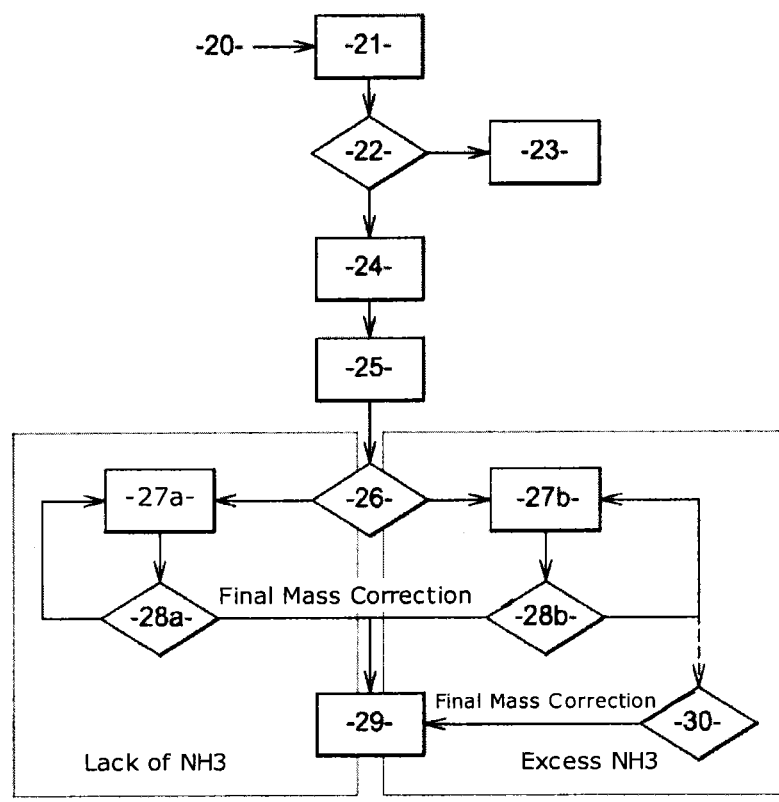
FIG. 2 shows the flowchart of anomaly detection and injection modification process, as implemented in a method according to the invention.

The goal is to integrate the present invention in module 11 which calculates the quantity of urea to be injected. The operation of the correction method according to the invention will now be described in a general manner by means of FIG. 2. FIG. 2 does not show the preliminary stages of the process, which consist in determining the initial quantity of reducing agent to be injected, and in injecting this quantity.

First, a gas sensor is used to determine, in stage 20, the composition of the gas present at the outlet of the SCR catalyst. Indeed, if the chemical reduction reaction takes place completely and in stoichiometric conditions, the only gas normally emitted at the outlet of the catalyst is nitrogen. On the other hand, if there is over-injection or under-injection of reducing agent, the gas emitted at the outlet will be respectively ammonia or nitrogen oxide. In this way, using a sensor with an output signal that depends on the composition of the gas, it is possible to detect, in stage 21, the presence of an anomaly.

Detection of an anomaly in block 21 triggers a process for clearly identifying the nature of the anomaly (i.e., the over-injection or under-injection of reducing agent).

Before starting an in depth analysis, it is first verified, in stage 22, that the vehicle is situated in a zone of normal operation. Indeed, if the vehicle is in an unusual situation, the detection of an anomaly at the outlet of the reduction catalyst is not necessarily a reflection of a dysfunction of the dosing process. In a preferred manner, the performed measurements are not taken into account in this case, and the process is then in position 23 in which no action is taken.

On the other hand, if the vehicle is in normal operating mode, the anomaly must be analyzed in order to take the necessary corrective measures. In order to determine whether the anomaly is due to over-injection or under-injection the hypothesis is made, in block 24, that the conversion efficiency is insufficient relative to the desired efficiency, in other words the quantity of injected reducing agent is insufficient to convert all nitrogen oxide emitted at the exhaust of the engine.

Then, in block 25 a modification is made to remedy this supposed anomaly. This modification consists, for instance, in increasing the injected quantity of reducing agent. Following this modification, a new measurement is taken at the outlet of the catalyst in order to determine, in block 26, the effect of the supplementary injection.

If following the increase of reducing agent there is an improvement in conversion efficiency, this means that the initial hypothesis was correct. Consequently, augmentation of the injection continues, in block 27a, until, in block 28a, a return to acceptable efficiency is detected.

On the other hand, if the increase activated in stage 25 does not lead to higher efficiency, this means that the initially made hypothesis of under-injection was false. In this case, the injection is cut immediately, in block 27b, until all of the reducing agent stored in the SCR catalyst is desorbed (block 28b). This desorption can be relatively long (block 30) before reaching an acceptable conversion rate without release of ammonia in the atmosphere.

When the conversion efficiency has returned to a normal situation, no matter what the detected anomaly is, the nature/direction of the applied modification (i.e., whether the modification is an increase or decrease) is stored in memory, in block 29.

In the framework of implementing the method according the invention, the memorization of the modification allows the detection of several successive modifications of the same direction (i.e., successive increases or successive decreases), leading to the necessity to correct directly the mathematical model controlling the dosage.

Figure 3:
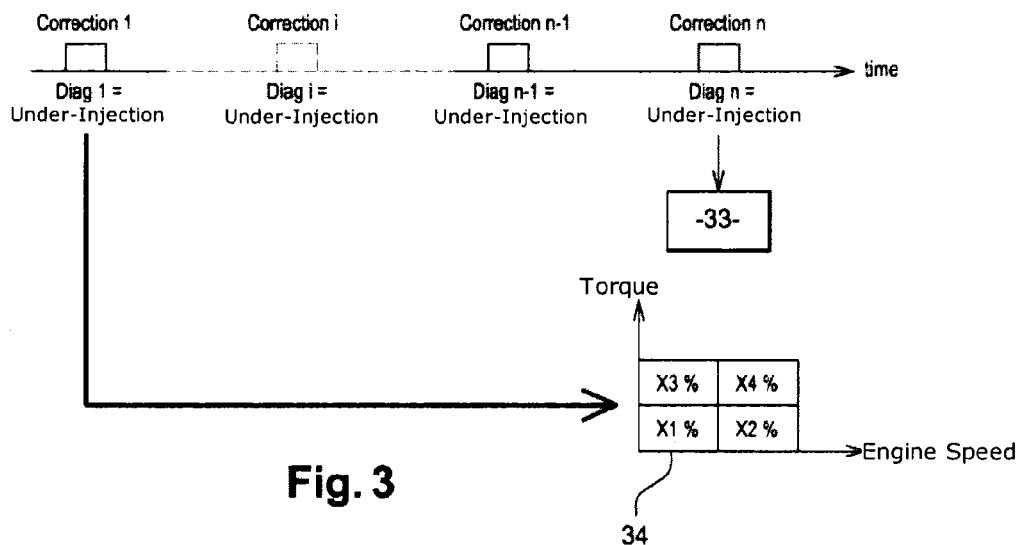
FIG. 3 shows the chronology of the method according to the invention.

The chronology of a process using this memorization is shown in FIG. 3. On the time axis are shown different occurrences during which diagnostics are performed (Diag 1, . . . , Diag i, . . . , Diag n), allowing, for example, to detect under-injection, and during which a correction is made (Correction 1, . . . , Correction i, . . . , Correction n) to remedy the problem of under-injection. The corrections made are recorded in the memory of a processor used for implementation of the method.

When the number of successive corrections of the same direction reaches a predetermined value n, a correction 33 takes place of the mathematical model used for dosing the reducing agent. This correction 33 consists in applying a correction factor, as a function of the operating phase in which the engine is situated. This correction factor corresponds with a predetermined correction factor weighted by a variable parameter as a function of the operating status of the vehicle.

In order to establish the variable parameter, four distinct zones of vehicle operation are identified, characterized by intervals of engine speed variation and engine torque variation. During different occurrences of diagnostics/correction, the elapsed time is measured in each of these engine zones, in order to produce a graph 34 used to determine the percentage of time that the vehicle operates in each of the zones. Obviously, these percentages are such that the sum Xi is equal to 100%.

The four engine zones correspond to zones of normal operation, as mentioned previously in the description of FIG. 2.

Figure 4:
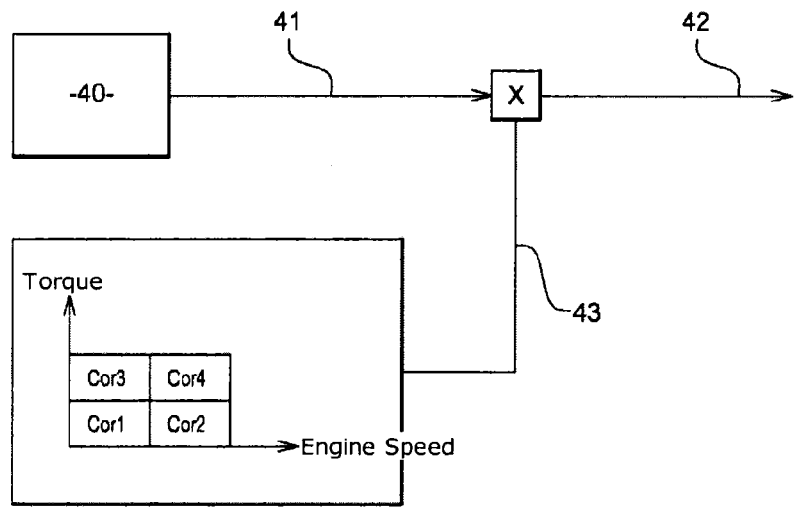
FIG. 4 is a block diagram showing in a detailed manner the correction of the mathematical model in the framework of a method according to the invention.

An example of correction 33 applied to the mathematical model is detailed by means of the block diagram of FIG. 4.

The mathematical model 40 determines the quantity of nitrogen emitted at the outlet of the engine, which is recorded in the memory of the processor according to the invention. This mathematical model determines, as a function of the operating parameters of the engine, the emitted quantity of nitrogen oxide 41.

Knowing the selective reduction chemical reaction it is possible, starting from a quantity of nitrogen oxide, to determine the quantity of ammonia, or reducing agent, needed to perform the reaction in stoichiometric conditions.

However, in the framework of the present invention, it is necessary to correct the mathematical model by applying, to the calculated nitrogen oxide quantity 41, a corrective factor 43. This corrective factor is equal to one of the values Cor1, Cor2, Cor3 or Cor4, determined in the following manner:

$$\text{Cor } i \text{ new} = \text{Cor } i \text{ old} + \text{CorMax} * Xi \%, \text{ where}$$

Cor i new is the correction value calculated for a vehicle situated in operating zone i, Cor i old is the correction value calculated during the preceding activation of the method for operating zone i. CorMax is a previously determined constant as a function of different parameters of the treatment system, which corresponds to the previously described correction factor. If the diagnostics which led to this correction show under-injection, CorMax is a positive constant; on the other hand, if the diagnostics show over-injection, CorMax is a negative constant.

$Xi$ % corresponds with the previously cited variable parameter, and represents the temporal part of the zone i, determined as previously described by means of FIG. 3.

The $Xi$ % are reinitialized with each correction of the model, or with each modification of the injection which is of different direction than the modification made at the preceding occurrence, for instance, if under-injection is detected, leading to increase of the quantity of injected reducing agent, followed by detection of over-injection, leading to reduction or cutting of the injection.

The method defined in the present invention maintains the efficiency of the SCR system while limiting the emission of harmful gas, such as ammonia, in the atmosphere.

Furthermore, this method eliminates the cost of a supplementary nitrogen oxide sensor located upstream of the SCR system. Indeed, in the present method, the quantity of nitrogen oxide emitted by the engine is determined starting from the mathematical model, if necessary, corrected in the framework of the implementation of this method.

The invention claimed is:

1. A method for correcting a model for determining a quantity of reducing agent to be injected for selective catalytic reduction of nitrogen oxides contained in exhaust gas; the method comprising the following stages:
   determining a quantity of reducing agent to be injected as a function of a quantity of nitrogen oxide emitted and an initial mathematical model,
   determining, by means of a measurement of a quantity and/or a composition of gas at an outlet of a catalyst, whether a reduction reaction is taking place in correct conditions,
   if an anomaly is detected, modifying the quantity of reducing agent to be injected,
   if an implementation of this method leads to a number of successive increases or decreases of the quantity of reducing agent to be injected greater than a predetermined value N:
   correcting the initial mathematical model to determine a corrected model, and
   replacing the initial mathematical model with the corrected model.

2. The method according to claim 1, in which the stage of determining whether the reduction reaction takes place in correct conditions comprises the following stages:
- determining a conversion efficiency of nitrogen oxide in response to the injection of the determined quantity of reducing agent, as a function of the measurement of the quantity of gas at the outlet of the catalyst,
- comparing a conversion efficiency, called real efficiency, with a required minimum efficiency, and
- if the difference between the required minimum efficiency and the real efficiency is greater than a predetermined threshold, detecting a presence of the anomaly.

3. The method according to claim 1, wherein, if the modification of the quantity of reducing agent made during one occurrence of the method is of a same direction as the modification made during a preceding occurrence of the method, a value of a counter used for implementation of the method is incremented, and if the modification is of a different direction than the modification of the preceding occurrence of the method, the value of the counter is initialized to zero.

4. The method according to claim 1 wherein the method is applied to a treatment of exhaust gas emitted by an engine of an automotive vehicle, and in which the correcting of the mathematical model comprises applying a correction factor corresponding to a predetermined correction factor weighted by a parameter that varies as a function of an operating status of the automotive vehicle.

5. The method according to claim 4, in which the predetermined correction factor is a positive factor in case where the successive modifications are increases and a negative factor in case where the successive modifications are decreases.

6. The method according to claim 4, in which the variable parameter allows weighting of the correction factor as a function of engine speed and engine torque.

7. The method according to claim 4 in which weighting is performed by determining operational zones, defined by a range of values of engine speed, and a range of values of engine torque, and by defining a law of variation of the variable parameter so that a value of the parameter is constant inside each of the operational zones, and represents an elapsed time in this operational zone relative to a total time, over a specific period.

8. The method according to claim 7, in which the elapsed time is reinitialized with each correction of the mathematical model and a determined period is defined as a period situated between a preceding correction of the mathematical model and a present correction of the mathematical model.

9. A system for treating exhaust gas installed in an automotive vehicle, in which the treatment comprises selective catalytic reduction, in a catalyst, of nitrogen oxides contained in the exhaust gas by a reducing agent stored in a reservoir and injected in an exhaust line, the system comprises a mathematical model for determining a quantity of reducing agent to be injected, and comprises means for implementing a determination method; the determination method comprising stages for:
- determining a quantity of the reducing agent to be injected as a function of a quantity of nitrogen oxide emitted and an initial mathematical model,
- determining, by means of a measurement of a quantity and/or a composition of gas at an outlet of the catalyst, whether a reduction reaction is taking place in correct conditions,
- if an anomaly is detected, modifying the quantity of reducing agent to be injected,
- if an implementation of this method leads to a number of successive increases or decreases of the quantity of reducing agent to be injected greater than a predetermined value N:
- correcting the initial mathematical model to determine a corrected model, and
- replacing the initial mathematical model with the corrected model.

* * * * *